(12) United States Patent
Holmdahl

(10) Patent No.: US 8,964,974 B2
(45) Date of Patent: Feb. 24, 2015

(54) ZERO CONFIGURATION OF SECURITY FOR SMART METERS

(71) Applicant: Itron, Inc., Liberty Lake, WA (US)

(72) Inventor: Bret Gregory Holmdahl, Greenacres, WA (US)

(73) Assignee: Itron, Inc., Liberty Lake, WA (US)

( * ) Notice: Subject to any disclaimer, the term of this patent is extended or adjusted under 35 U.S.C. 154(b) by 153 days.

(21) Appl. No.: 13/837,548

(22) Filed: Mar. 15, 2013

(65) Prior Publication Data

US 2014/0211939 A1 Jul. 31, 2014

Related U.S. Application Data

(60) Provisional application No. 61/757,902, filed on Jan. 29, 2013.

(51) Int. Cl.
| | | |
|---|---|---|
| *H04L 9/00* | (2006.01) | |
| *G06F 21/72* | (2013.01) | |
| *G06Q 20/14* | (2012.01) | |
| *G06Q 50/06* | (2012.01) | |
| *G01D 4/00* | (2006.01) | |
| *H04L 29/08* | (2006.01) | |
| *H04Q 9/00* | (2006.01) | |

(52) U.S. Cl.
CPC ............. *G06F 21/72* (2013.01); *G06Q 20/145* (2013.01); *G06Q 50/06* (2013.01); *G01D 4/002* (2013.01); *G01D 4/006* (2013.01); *H04L 29/08* (2013.01); *H04Q 9/00* (2013.01); *H04Q 2209/10* (2013.01); *H04Q 2209/40* (2013.01); *H04Q 2209/25* (2013.01); *H04Q 2209/60* (2013.01); *H04Q 2209/50* (2013.01)

USPC ............. 380/44; 713/156; 713/157; 713/158; 713/159; 713/160; 726/27; 726/28; 726/29; 726/30

(58) Field of Classification Search
USPC .......................................................... 380/44
See application file for complete search history.

(56) References Cited

U.S. PATENT DOCUMENTS

| | | | |
|---|---|---|---|
| 2008/0117076 A1 | 5/2008 | Klaus et al. | |
| 2012/0173873 A1* | 7/2012 | Bell et al. ...................... | 713/156 |
| 2014/0214728 A1 | 7/2014 | Holmdahl | |

FOREIGN PATENT DOCUMENTS

| | | |
|---|---|---|
| WO | WO2008086213 | 7/2008 |
| WO | WO2010096923 | 9/2010 |

OTHER PUBLICATIONS

PCT Search Report and Written Opinion mailed Apr. 16, 2014 for PCT Application No. PCT/US14/13614, 10 Pages.
PCT Search Report and Written Opinion mailed May 20, 2014 for PCT Application No. PCT/US14/13622, 9 Pages.

\* cited by examiner

*Primary Examiner* — Longbit Chai
(74) *Attorney, Agent, or Firm* — Lee & Hayes, PLLC

(57) ABSTRACT

Techniques for injecting encryption keys into a meter as a part of a manufacturing process are discussed. Since various encryption keys injected into meters may be specific to each individual meter, a utility company customer may require a copy of the injected encryption keys associated with each individual meter. The techniques may include providing a copy of keys injected into each meter to a utility company customer. In some instances, the meter manufacturer may not store or persist various encryption keys that are injected into the meters during the manufacturing process.

20 Claims, 4 Drawing Sheets

ZERO CONFIGURATION OF SECURITY FOR SMART METERS

CROSS REFERENCE TO RELATED APPLICATIONS

This application claims priority to U.S. Patent Application Ser. No. 61/757,902, filed on Jan. 29, 2013, and entitled "Performing Demand Reset in a Secure Mobile Network Environment", the entirety of which is incorporated herein by reference.

BACKGROUND

Electricity, natural gas and water are examples of consumable resources that may be monitored, delivered and sold within a metered environment. The metered environment may be configured in an automated meter reading (AMR) configuration and/or an advanced metering infrastructure (AMI) configuration.

In either of these configurations, meters may transmit consumption messages and receive command, programming or other messages over one or more radio frequencies (RF). To create a secured metered environment, these command and messages need to be secured. To accomplish this, it is common for meters to contain a variety of encryption keys to provide for a secured wireless messaging environment.

Traditionally, encryption keys are installed in meters at a point of installation by a utility company meter installer. Therefore, the meter installer is required to possess encryption keys for meters, and perform a secure key injection of meter keys as part of a meter installation process. This process increases installation time of meters, reduces meter security and requires that the meter installer have a level of expertise required to perform a key injection process.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

Figure 1:
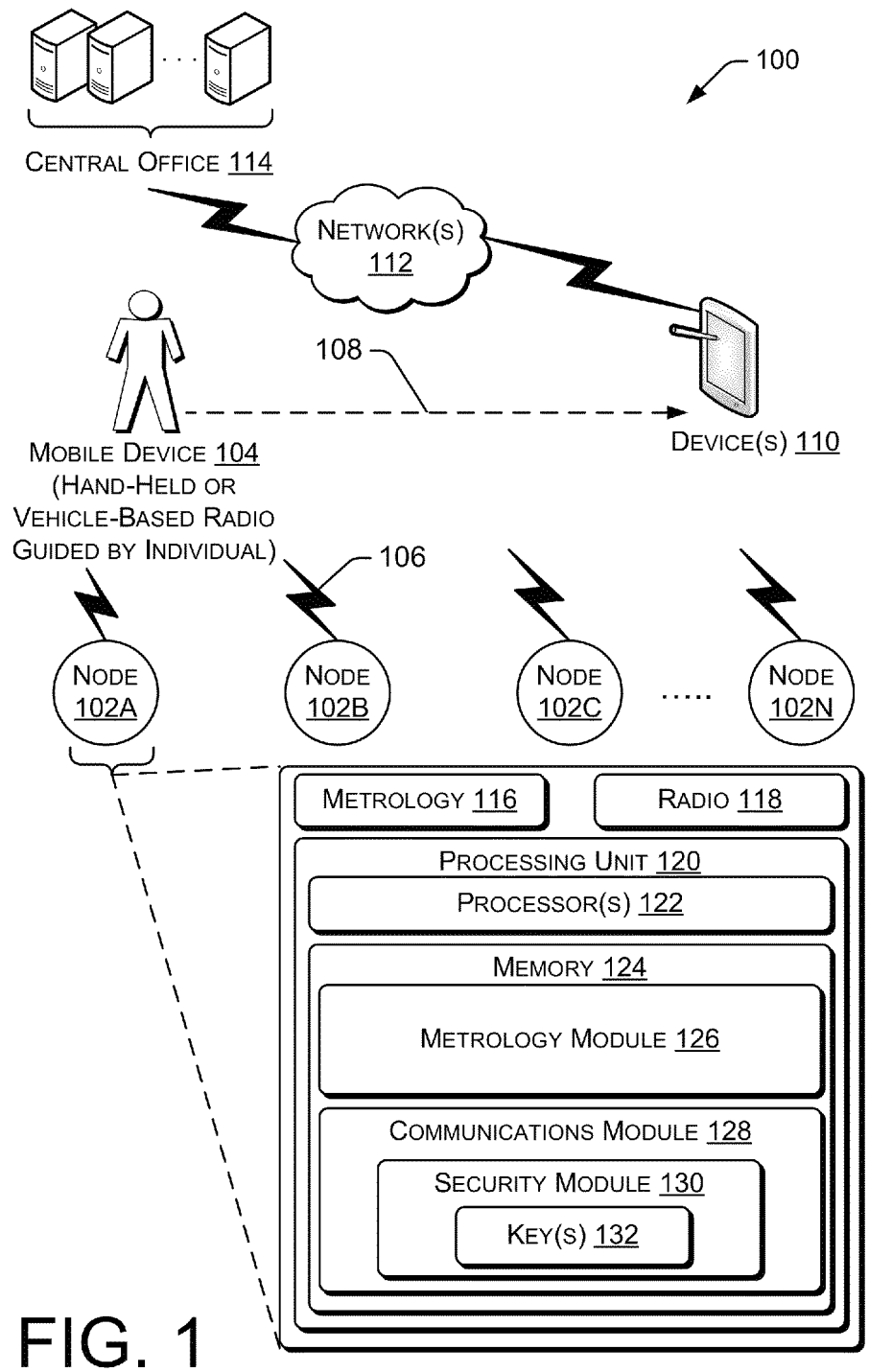
FIG. 1 is a block diagram showing an example of secure operation of utility meters in a metered environment configured as a mobile mode system.

A meter manufacturer may provide unsecured utility meters (e.g., meters that do not contain encryption keys) to a customer, such as a utility company. The utility company may then be responsible for securing each of the meters by injecting various encryption keys into the meters. It is common for these encryption keys to be installed in meters at a point of installation by a utility company meter installer.

However, as meters become more sophisticated, it is less desirable for a meter manufacturer to provide unsecured meters to utility company customers. Meter manufacturers may desire that certain meter functions do not work without being secured. As an example, meters may support a disconnect feature, such that upon reception of a particular wireless command, a meter may disconnect delivery of a consumable resource to an end-point consumer of the consumable resource. It is therefore advantageous that commands that control meter configuration, as well as meter security, be secured prior to installation.

The disclosure describes techniques for injecting encryption keys into a meter as a part of a manufacturing process. In one example, the meter may then be provided to a utility company customer, such that the utility company customer may not have to inject encryption keys into the meter prior to, during, or after a meter installation process.

Since various encryption keys injected (e.g., copied) into meters may be specific to each individual meter, a utility company customer requires a copy of the injected encryption keys associated with each individual meter. This disclosure also describes techniques for providing a copy of keys injected into each meter to a utility company customer. By doing so, the meter manufacturer may not need to store or persist various encryption keys that are injected into the meters during the manufacturing process. This may also mitigate liabilities of a meter manufacturer by not possessing keys of operational meters owned by a utility company customer.

The discussion herein includes several sections. Each section is intended to provide examples of techniques and/or structures, but is not intended to indicate elements which must be used and/or performed. A section entitled "Example Mobile Mode Environment" discusses aspects of meters operating within a secured mobile mode environment. A section entitled "Example Network Mode Environment" discusses aspects of similar meters operating within a secured network mode environment. A section entitled "Example Meter Key Injection Environment" discusses example injection of meter keys as part of a manufacturing process. A section entitled "Example Methods" discusses example operations to perform injection of meter keys in meters during manufacturing. A brief "Conclusion" follows these sections. This brief introduction is provided for the reader's convenience and is not intended to describe and/or limit the scope of the claims or any section of this disclosure.

Example Mobile Mode Environment

FIG. 1 shows an example metered environment configured as a mobile mode system 100. The mobile mode system 100 includes a plurality of utility meters that may measure consumption of electricity, natural gas, water and/or other consumable resources. Each meter may be integrated with a radio and data processing functionality, and may constitute a node within the mobile mode system 100. In the example, nodes 102A through 102N represent smart meters that communicate information with a radio of a mobile device 104, which may be hand-held or vehicle-based. As another example, nodes 102A through 102N may represent smart utility meters (e.g., electric, gas, and/or water meters), sensors (e.g., temperature sensors, weather stations, frequency sensors, etc.), control devices, transformers, routers, servers, relays (e.g., cellular relays), switches, valves, and other network devices. The mobile device 104 may include a radio, a processor, memory and software, and may be guided and/or operated by an individual. The nodes 102 may communicate with the mobile device 104 by means of radio frequency (RF) transmissions 106. The transmissions 106 may be broadcast periodically, randomly, on demand, or at another interval or frequency, and may include a consumption message (e.g., a standard consumption message that indicates node identification, a meter reading, a consumption value, and/or a date and time, etc.), a command messages (e.g., disconnect command, encryption key exchange command, demand reset command, etc.) and/or corresponding response messages. The transmissions 106 may be uniquely encrypted for each node 102, such that mobile mode system 100 is a secured mobile mode system. Mobile device 104 may send commands, such as secure encrypted commands, to nodes 102, and in response, change a configuration of one or more nodes 102 and/or receive corresponding encrypted response messages from one or more nodes 102, or the like.

The mobile device 104 may be moved along a route 108, which may bring it into proximity to a plurality of nodes 102A through 102N. As the mobile device 104 passes along the route 108, it may gather data from the response messages and consumption messages via transmissions 106 from the nodes 102. The data gathering process may be performed by the internal data processor (e.g., microprocessor, memory, software and/or ASIC) and the radio. Those consumption and other messages may be aggregated in a desired format and stored in a computing device 110. The computing device 110 may transmit the consumption and other information over one or more networks 112 (e.g., a local area network, neighborhood area network, a cellular network and/or the Internet), and/or provide the consumption and other information by other means (e.g., file download) to a central office 114 or other data storage and/or processing facility.

Details of node 102A are shown in FIG. 1 as an example of structure and function that may be utilized in one or more nodes. Metrology 116 is representative of resource consumption measurement devices for measurement of electricity, natural gas, water, etc. The radio 118 may function both as a receiver and/or a transmitter. In the example of FIG. 1, the radio 118 may send transmissions 106 to the mobile device 104 and receive transmissions 106 from the mobile device 104. Mobile device 104 may include various encryption keys unique to each node 102 to facilitate communications with each node 102.

A processing unit 120 may include one or more processors 122 in communication with one or more memory devices 124. The processing unit 120 may receive data from, and/or communicate with, the metrology 116 and the radio 118. The processor 122 may be a microprocessor, microcontroller, application specific integrated circuit (ASIC) or other device configured to process data.

The memory 124 may include programs, modules, applications and/or data files, and may be read from, and/or written-to, by the processor 122. Metrology module 126 may interface with metrology 116 to collect consumption and/or demand data for a resource, such as electricity, gas, water, etc.

Communications module 128 may be configured to interface with radio 118 to communicate a radio frequency (RF) message with device 104. Some or all of nodes 102 may be secured, such that received commands as well as responses or readings are encrypted. To facilitate secured communications, communications module 128 may include security module 130. Security module 130 may be used to provide security features to nodes 102. To facilitate communication security, security module 130 may store one or more security keys 132 used to decrypt various received commands, and encrypt various transmissions. Security keys 132 may be injected into node 102 as part of a manufacturing process of node 102. Security keys 132 may be used to decrypt commands from mobile device 104, and to encrypt responses or messages transmitted to mobile device 104.

Example Network Mode Environment

Figure 2:
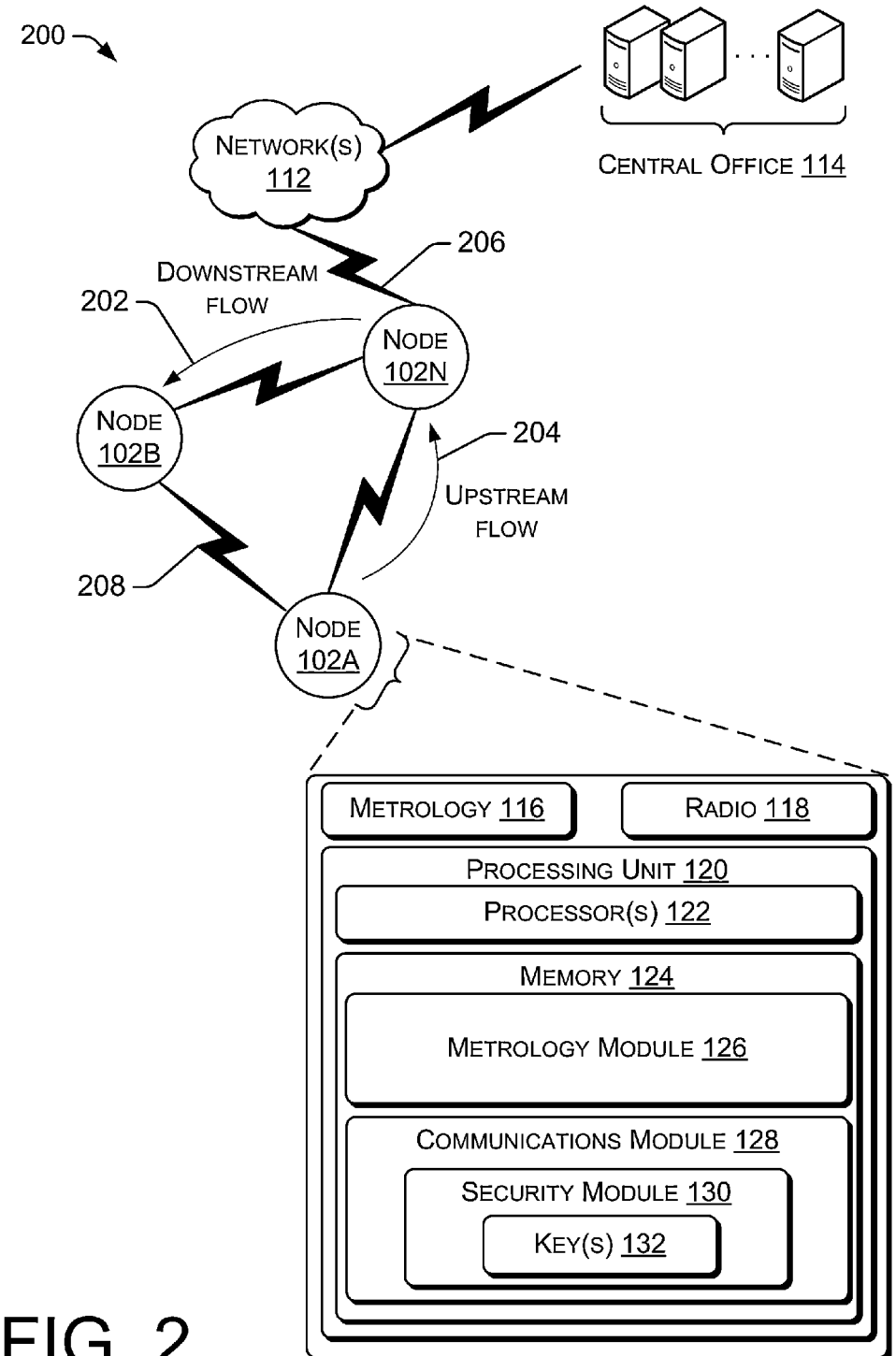
FIG. 2 is a block diagram showing an example of secure operation of utility meters in a network mode or configuration.

FIG. 2 shows an example metered environment configured as a network mode system 200. The network mode system 200 includes a plurality of utility meters that may measure consumption of, and/or demand for, electricity, natural gas, water or other consumable resource. Each meter may be integrated with a radio and data processing functionality, and may constitute a node within the network mode system 200. In the example, nodes 102A through 102N may represent smart meters that transmit information through a mesh network. As another example, nodes 102A through 102N may represent smart utility meters (e.g., electric, gas, and/or water meters), sensors (e.g., temperature sensors, weather stations, frequency sensors, etc.), control devices, transformers, routers, servers, relays (e.g., cellular relays), switches, valves, and other network devices. The information may include downstream flows 202 of packets, which may include commands and information passing through a network 112 and originating from the central office 114. The information within the mesh network may include upstream flows 204 of packets, which may include data obtained from the metrology 116 and reported to the central office 114. Both the downstream data flows 202 and upstream data flows 204 may be made over RF links 206 between various nodes and/or other networks. Therefore, networks illustrated in example environment 200 may be used communicate secured commands and responses between nodes 102 and central office 114.

The network mode system 200 may be configured as a mesh network (as shown in FIG. 2) or as a "star" network (in other embodiments). In a mesh network configuration, nodes 102A and 102B may communicate over a link 208. However, in a star configuration, link 208 may be missing, and nodes 102A and 102B may communicate directly with a center node 102N of the star (e.g., a data collector).

Some or all of nodes 102 may be secured, such that received commands as well as responses or readings are encrypted. Security module 130 may be used to provide security features to nodes 102. To facilitate communication security, security module 130 may store one or more security keys 132 used to decrypt various commands received from central office 114, and encrypt various responses or messages transmitted to central office 114. Security keys 132 may be injected into node 102 as part of a manufacturing process of node 102. Central office 114 may include various encryption keys associated with each node 102 to facilitate communications with each node 102.

Example Meter Key Injection Environment

Figure 3:
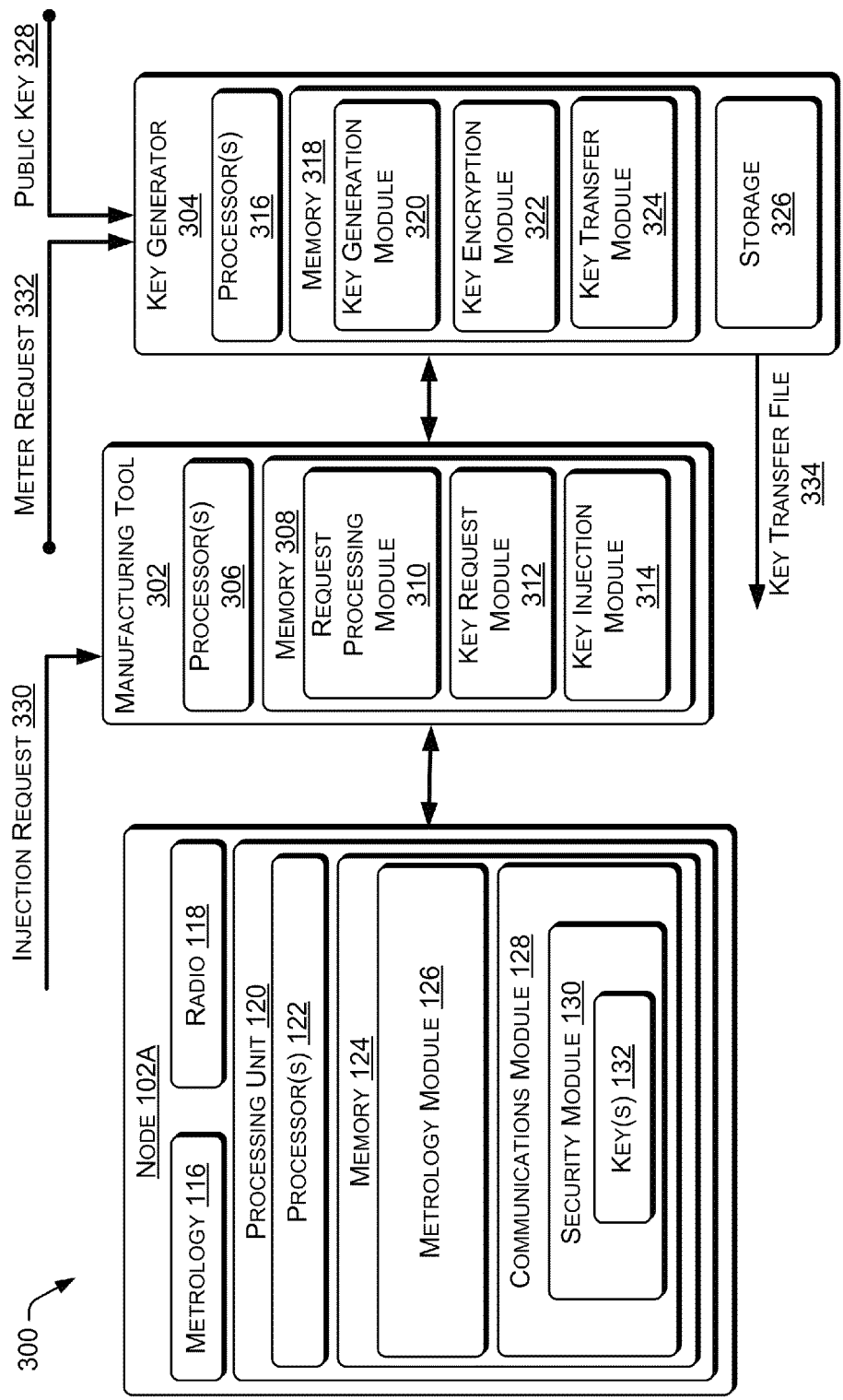
FIG. 3 is a block diagram showing an example environment for injecting security keys in a utility meter during manufacturing.

FIG. 3 is an example environment 300 to illustrate a key injection process into a node, such as node 102A. As an example, manufacturing tool 302 injects meter keys into node 102A. Manufacturing tool 302 may obtain keys from key generator 304 for injecting into node 102A as part of a manufacturing process of node 102A. As an example, environment 300 may include a secured portion of a factory used for a manufacturing process of a meter. Therefore, node 102A, manufacturing tool 302 and key generator 304 are located within a secured environment and connected using secured connections.

As shown in example environment 300, manufacturing tool 302 may contain one or more processors 306 communicatively coupled to memory 308. Memory 308 may contain modules for execution by processor(s) 306, such as request processing module 310, key request module 312 and key injection module 314. Key generator 304 may contain one or more processors 316 communicatively coupled to memory 318. Memory 318 may contain modules for execution by processor(s) 316, such as key generation module 320, key encryption module 322 and key transfer module 324. Key generator 304 may also contain storage 326, such as non-volatile storage for persisting encrypted meter keys.

As an example, a customer, such as a utility company customer, may provide a public key 328 to a meter manufacturer such that public key 328 is provided to the meter manufacturer's key generator 304. Public key 328 may be an asymmetric public encryption key used to encrypt operational meter keys for meters to be provided by the meter manufacturer to the utility company customer. Key generator 304 may associate the public key 328 with the utility company customer, and store a public key 328/customer pair in storage 326. As an example, a meter key encrypted with public key 328 may only be decrypted by an associated private key of the utility company customer, such that the meter manufacturer does not possess the associated private key of the utility company customer. Public key 328 may be provided to key generator 304 manually by a user, electronically via a network, directly or indirectly by the utility company customer, or by any other suitable means.

As an example, as a part of processing an order for meters to be provided to the utility company customer by the meter manufacturer, during a manufacturing process of node 102A, node 102A is securely interfaced to manufacturing tool 302. For example, node 102A is connected to manufacturing tool in a secured environment, such that node 102A is connected to manufacturing tool 302 using a secured direct connection or other secured connection. Request processing module 310 may receive and process an injection request 330 to inject meter keys into node 102A as a part of a manufacturing process of node 102A. Request processing module 310 may verify that node 102A is securely connected to manufacturing tool 302. In response to injection request 330, key request module 312 may generate a meter key request, and transfer the meter key request to key generator 304. As an example, node 102A, manufacturing tool 302 and key generator 304 may be located in a secured environment, connected using secured connections. The meter key request may contain a utility company identifier (ID), a meter ID and a listing of what types of keys to generate. The listing of the types of keys to generate may indicate a desired security level for node 102A.

In response to the meter key request, key generation module 320 generates the keys as indicated in the meter key request. As an example, the generated keys may be randomly generated symmetric keys that are unique to each meter. After the keys are generated, key encryption module 322 may encrypt the generated keys using public key 328, and store the encrypted keys in storage 326. The generated keys, in unencrypted form, are securely passed by key generation module 320 to manufacturing tool 302, where key injection module 314 provides the generated keys to security module 130 of node 102A for storage in key(s) 132. Thus, the generated keys are injected into node 102A, and an encrypted version of the generated keys are stored, such as in storage 326.

Neither key generator 304 nor manufacturing tool 302 persist the generated keys (e.g., stores the generated keys in non-volatile memory). Thus, the meter manufacturer does not maintain, persist or store the generated keys in any location except key(s) 132 of node 102A as part of the key injection process. The meter manufacturer only stores the encrypted version of the generated keys, such as in storage 326.

As an exception, the utility company customer may indicate that one or more keys (e.g., reading key described below) will be a common key(s) to be shared across multiple meters. A reading key may be used merely to read data from meters, such as consumption data. Thus, reading keys may not be considered operational keys that provide configuration access to a meter. As such, the meter manufacturer may maintain (e.g., store) one or more customer specific reading keys as plain-text keys that are not meter specific keys. Consequently, reading keys may be stored, unencrypted, for example in storage 326. Furthermore, in response to the meter key request described above, key generation module 320 may merely extract the one or more reading keys from storage, such as storage 326, as a function of an associated customer identifier, as part of the key generation process. Key injection module 314 may then merely inject the one or more extracted meter keys along with the other generated keys into node 102A as part of the key injection process.

Keys may be generated and injected into other nodes 102 as described above, for example, as a part of processing the order for meters to be provided to the utility company customer by the meter manufacturer. Encrypted versions of the generated keys, with a conditional exception pertaining to reading keys, may be maintained in a database, such as storage 326 associated with, for example, meter and customer IDs.

After the manufacturing process, meters may be provided to the utility company customer. To be able to utilize the meters, the utility company customer requires a copy of the unique generated keys injected into each individual meter. Meter request 332 may be provided to key generator 304. Meter request 332 may include a list of one or more meters (e.g., list of meter IDs). In response to receiving meter request 332 at key generator 304, key transfer module 324 may retrieve and aggregate encrypted keys, and conditionally unencrypted reading keys, for each meter identified in meter request 332, and provide the aggregated keys for each meter in key transfer file 334. Key transfer module 324 may additionally encrypt the key transfer file 334, such that key transfer file 334 is a secure key transfer file (SKTF).

Key transfer file 334 may be provided to the utility company customer. The utility company customer may then use their private key to decrypt corresponding encrypted keys associated with each meter. As an example, the decrypted keys are symmetric keys that are the same keys that are stored in each associated meter. At least a portion of the keys stored in each meter may be unique to each meter, while one or more other keys (e.g., reading keys) may be common across multiple meters.

The meters may then be installed by meter installers of the utility company, such that the meter installers do not have to install keys as a part of the meter installation process. This supports a "zero configuration" of security as part of smart meter installation. For meters that have been "built to order", all other configuration parameters, in addition to the injected security keys, may have been previously configured for each meter, such that once installed and quickly tested, each meter may be instantly field operational. In the case where one or more reading keys are common across multiple meters, meter installers may use one or more plain-text reading keys to quickly test a meter following installation.

As an example, a meter (e.g., node 102) may support various levels of security to include:
  None—No security enabled. It should be noted that remote disconnect/connect, reset demand and mode switch functions may require command level security (e.g., command level security keys) and as such may not available when operating the meter with no enhanced security.

Commands Only—Only commands that affect the meter and/or the meter's peripheral device states must be secured.

All—Command and reading messages are to be secured.

Some example security keys that may be injected in a meter during manufacturing include:

Reading—Used to secure/un-secure reading data. For the meter, this may include bubble-up messages and 2-way data logging commands.

Command/Programming—Used to secure commands that modify both the metrology and non-metrology state of the meter, or used to secure commands that modify at least one of a metrology or non-metrology state of the meter.

Revocation—Used to perform key exchanges. Key exchanges include both adding new keys (e.g., null->Key), exchanging one key for another, and removing one or more keys (e.g., Key->null).

Recovery—This is a special revocation key. This key may perform the same function as the other revocation keys but may not participate in the active/standby rollover operations. An intent of this key may be to allow the customer to set aside a key in a secure location to be used in an event the revocation keys are lost.

Factory Keys—Factory keys may include a Utility Factory Key (e.g., a customer factory key) and a Manufacturer Factory Key. A Utility Factory Key may include a non-volatile key that may be injected during the manufacturing process that can be used to inject the initial keys into the meter when enabling security. A Manufacturer Factory Key may include a permanent key that may be injected into non-volatile memory during the manufacturing process. The Manufacturer Factory Key may allow a manufacturer to change the Utility Factory key using an RF-based command. Changing of the Utility Factory key may typically be done as part of a returned sales order process.

As discussed above, the reading keys may be shared by multiple meters within a utility company's installation. Some or all of the other key types may be unique for each meter. Since factory keys are generated by the meter manufacturer, factory keys may be maintained (e.g., stored) by the meter manufacturer in plain-text, unencrypted form. As an example, operational keys may include command/programming, revocation and recovery keys such that reading keys and factory keys may be defined as non-operational keys. Since factory keys are keys generated and used by the meter manufacturer and used by a customer to enable meter security, the meter manufacturer may maintain factory keys in an unencrypted plaintext form. As such, factory keys may not be encrypted by the public key of the utility company customer. Additionally, reading keys may or may not be encrypted by the public key of the utility company customer at the discretion of the meter manufacturer and/or the utility company customer.

Therefore, a meter manufacturer may receive a public key and a specified security level (e.g., customer ID, meter ID, specification of key type) for a meter from a utility company customer. The meter manufacturer may then generate keys for the node in accordance with the specified security level, and inject the generated keys in the node. The meter manufacturer may then encrypt at least a subset of the generated keys using the utility company's public key, and store a file that includes the encrypted subset of the keys and one or more keys of the subset that are not be encrypted. The meter manufacturer may then provide a file (e.g., in an encrypted form) containing meter keys for specified meter(s) to the utility company customer and ship or provide the meter(s) to the utility company customer.

Example Methods

Figure 4:
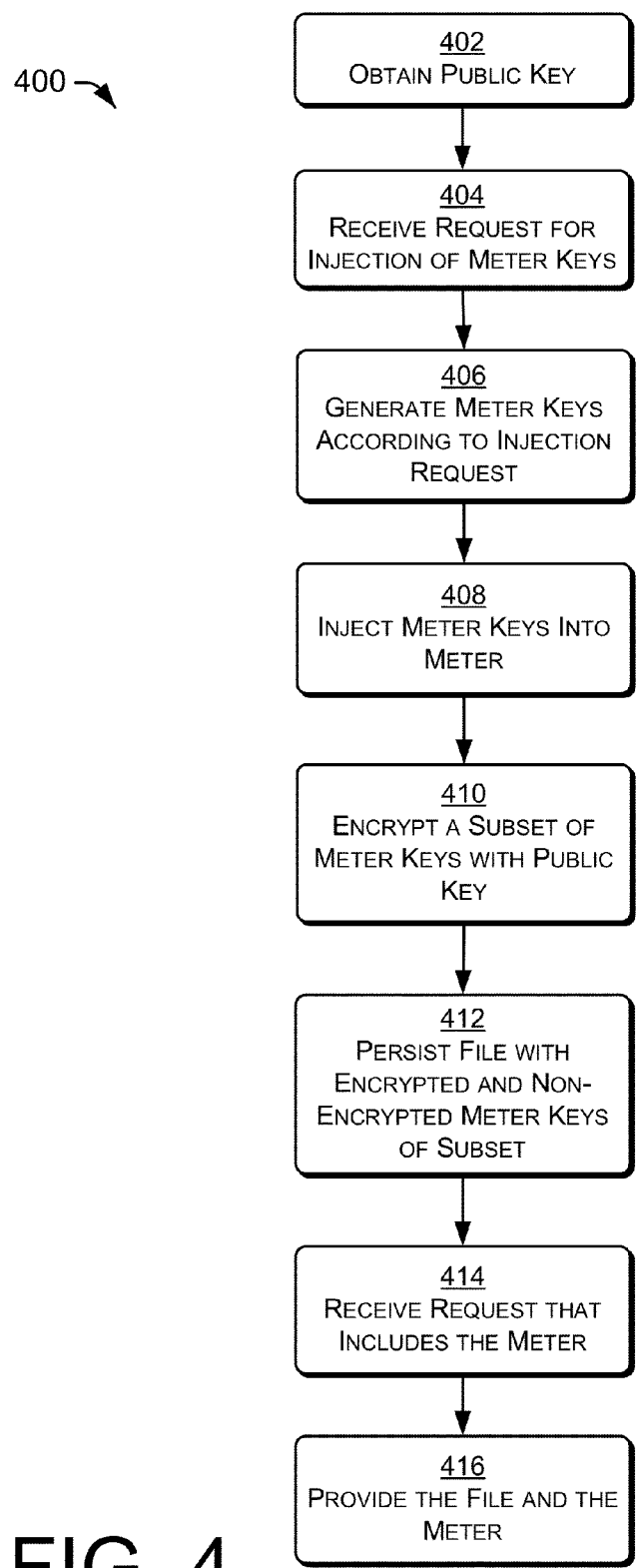
FIG. 4 is a flow diagram showing example operations usable to inject security keys in a utility meter during manufacturing.

FIG. 4 shows operations, methods and techniques that may be represented by a collection of acts, blocks or operations in a logical flow graph, which represent a sequence of operations that can be implemented and/or executed by hardware, software, or a combination thereof. In one example, one or more functional blocks may be implemented by aspects including a microprocessor, a microcontroller, one or more memory devices, application specific integrated circuits, software blocks, subroutines and/or programs, etc.

Memory devices, computer-readable media and/or computer storage media may include volatile and non-volatile, removable and non-removable media implemented according to any techniques or technology for storage of information such as computer-readable instructions, data structures, program modules, or other data. As described herein regarding non-volatile media, a non-volatile storage device can retain stored information even when not powered. Computer-readable media includes, but is not limited to, random access memory (RAM), read only memory (ROM), electrically erasable programmable read only memory (EEPROM), flash memory or other memory technology, compact disk-read only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. Computer-readable media does not include modulated data signals or carrier waves.

Any such computer-readable media (e.g., memory 124 of FIGS. 1-2 and memory 308 and 318 of FIG. 3) may be part of a system or device. Moreover, the computer-readable media may include computer-executable instructions that, when executed by the processor(s), perform various functions and/or operations described herein. Such computer- and/or processor-readable memory and/or media may retain the instructions in a persistent and/or non-transitory manner.

FIG. 4 is a diagram 400 showing aspects of an example method of operation implemented for example, at least in part by manufacturing tool 302 and key generator 304 of FIG. 3.

At operation 402, a public key is obtained from a customer, such as a customer of the meter. As an example, a utility company customer provides one or more public keys to a meter manufacturer. The public key may be associated with products to be provided by the meter manufacturer, such as meters provided to a utility company customer. As an example, once the meter manufacturer has encrypted a meter key with the public key, the meter manufacturer does not possess the necessary private key that would allow decryption of the encrypted meter key. In this example, the utility company customer possesses the necessary private key that would allow decryption of the encrypted meter key. The public key may be stored in, or be accessible by, key generator 304 and may be used by key generation module 322 to encrypt meter keys generated by key generation module 320. The public key may be associated with a single meter, a group of meters or a plurality of meters for a customer.

At operation 404, a meter is securely coupled to manufacturing tool 302 and a request is received for injection of meter keys into the securely coupled meter. As an example, as a part of a manufacturing process for a meter, manufacturing tool 302 receives a request, such as injection request 330, to inject meter keys into a meter, or a group of meters. The request may include a customer identifier (ID) (e.g., utility ID) that identifies a customer of the meter and a meter ID that identifies the meter. The request may further include one or more key types that specify a security level for the meter and/or manufacturing tool 302 may already know the desired security level, based on, for example, the customer ID associated with the injection request. The key types may include operational keys as well as non-operational keys for a meter. As an example, the meter keys are symmetric keys that include operational keys that are specific to the meter and provide security for commands that control an operation of the meter. The key types may specify meter keys that include one or more of a reading key that secures data read from the meter, a command/programming key that secures commands that modify a metrology and a non-metrology state of the meter, a revocation key that secures commands to perform key exchanges to include adding a new key to the meter, exchanging one key for another in the meter and removing one or more keys from the meter, a recovery key that performs functions of the revocation key stored in a secure location to be used in an event that the revocation key is lost and/or a factory key that secures commands to inject other keys into the meter when enabling security. The command/programming key, the revocation key and the recovery key may be considered operational keys. As an example, in response to receiving injection request 330 to inject meter keys into a specified meter, manufacturing tool 302 may send a request to key generator 304 to generate meter keys. The request sent from manufacturing tool 302 to key generator 304 may include a customer identifier (ID) (e.g., utility ID) that identifies a customer of the meter, a meter ID that identifies the meter, and one or more key types that specify a security level for the meter.

At operation 406, meter keys are generated in accordance with the request for injection of meter keys. As an example, key generator 304 may generate operational meter keys in accordance with the injection request, and simply get other keys, such as one or more non-operational keys, from storage 326. As an example, reading keys (e.g., non-operational keys) may be shared across multiple meters of a customer, such that the meter manufacturer may persist reading keys in a plain-text unencrypted form. Additionally, factory keys that are specific to the meter manufacturer may also be persisted by the meter manufacturer in a plain-text unencrypted form. However, to mitigate liability, a meter manufacturer may not persist (e.g., store) any other keys in plain-text unencrypted form in non-volatile storage, such as a database or other permanent storage, such as storage 326. As such, key generator 304 may or may not be required to generate reading keys, as they may be stored in manufacturing tool 302 or in other storage (not shown). Likewise, key generator 304 may or may not be required to generate factory keys, as they may be stored in manufacturing tool 302 or in other storage (not shown). Alternatively, key generator 304 may generate and store factory keys. The factory keys may be specific for each meter, groups of meters, types of meters, or combinations thereof. As an example, factory keys may be unique for each meter. Key generator 304 may generate keys, such as operational keys, that are specific to each meter, or groups of meters. Key generator 304 may provide the keys (e.g., generated operational keys and non-operational keys) to manufacturing tool 302, such as in response to the associated request from manufacturing tool 302. Therefore, manufacturing tool 302 may receive meter keys for a meter in response to a request to generate meter keys, the meter keys to include one or more operational keys to secure commands that control an operation of the meter, as well as other keys, such as one or more reading keys.

At operation 408, manufacturing tool 302 injects the keys into the securely coupled meter. The keys are injected into the meter as part of a manufacturing process of the meter. As an example, key injection module 314 transmits the meter keys over a secured connection to security module 130, where the meter keys are stored in key(s) 132 of the meter.

Prior to, or in approximate conjunction with operation 408, at operation 410, key generator 304 encrypts at least a subset of the meter keys using the public key obtained from the customer for the meter. As an example, key generator 304 may encrypt operational keys, and not encrypt non-operational keys, such as reading keys and/or factory keys. As such, the operational keys may not be persisted in an unencrypted form in a non-volatile storage device of a manufacturer of the meter, such as in either key generator 304 and/or manufacturing tool 302.

At operation 412, a file is persisted (e.g., stored in non-volatile storage) comprising the encrypted subset of the meter keys. Additionally, the persisted file may also comprise one or more meter keys of the subset that are not encrypted. As an example, the meter manufacturer persists a file that comprises encrypted operational keys and unencrypted non-operational keys associated with a meter and an ID of a customer for the meter. As such, the meter manufacturer does not persist (e.g., store in non-volatile storage) operational keys in a plain-text unencrypted form. Thus, the meter manufacturer may persist data that includes encrypted meter keys for a plurality of meters for a plurality of customers, such that the meter manufacturer may not store or have access to operational meter keys in a plain-text unencrypted form. As an example, such data may be stored in a database that can process queries for one or more meters associated with, for example, corresponding customer IDs, and provide meter keys for the one or more requested meters.

At operation 414, a request that specifies one or more meters is received. As an example, key generator 304 receives a request for meter keys for one or more meters. In response to the request, key generator 304 generates a file that contains the associated encrypted and unencrypted keys for each requested meter. For additional security, key generator 304 may also encrypt the file to create a secure key transfer file.

At operation 416, the file and the meter are provided to the customer for the meter. As an example, the file is provided in response to receiving a request for the file that identifies the meter. Once the customer has the file, the customer may decrypt encrypted keys for meters in the file, and provide the decrypted keys to associated devices, such as devices 104 or central office 114, to allow for operational control and reading of individual meters.

As described herein, the customer may include a third party entity that works to obtain a meter for an ultimate customer for the meter, such as a utility company.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A method comprising:
configuring at least one computing device(s) to perform functions of:

receiving, by a manufacturing tool and/or a key generator, a request to generate meter keys including one or more operational keys that are a subset of the meter keys and that secure commands that control an operation of a meter;
generating the meter keys in accordance with the request;
injecting the generated meter keys into the meter;
encrypting with a public key at least the subset of the meter keys, wherein the public key is associated with a private key that is unknown to an entity performing the method;
storing a file comprising the encrypted subset of the meter keys; and
providing the stored file associated with the meter, wherein the file is associated with an identifier of the meter.

2. The method recited in claim 1, wherein the request includes:
a customer identifier (ID) that identifies a customer of the meter;
a meter ID that identifies the meter; and
an indication of one or more meter key types.

3. The method recited in claim 1, wherein the file further comprises one or more meter keys that are not encrypted.

4. The method recited in claim 1, wherein the public key is obtained from a customer of the meter and the providing the file comprises providing the file to the customer of the meter.

5. The method recited in claim 1, wherein the meter keys are to be injected into the meter as part of a manufacturing process of the meter.

6. The method recited in claim 1, wherein the meter keys are symmetric keys that include operational keys that:
are specific to the meter; and
provide security for commands that control an operation of the meter.

7. The method recited in claim 1, wherein the meter keys include at least one of:
a reading key;
a command/programming key;
a revocation key;
a recovery key; or
one or more factory keys.

8. The method recited in claim 7, wherein:
the reading key secures data read from the meter;
the command/programming key secures commands that modify a metrology and a non-metrology state of the meter;
the revocation key secures commands to perform key exchanges that include adding a new key to the meter, exchanging one key for another in the meter and removing one or more keys from the meter;
the recovery key performs functions of the revocation key stored in a secure location to be used in place of the revocation key; and
at least one of the one or more factory keys secures commands to inject other keys into the meter when enabling security.

9. The method recited in claim 7, wherein:
the command/programming key, the revocation key and the recovery key are operational keys; and
encrypting at least the subset of the meter keys using the public key does not encrypt at least one of the reading key or the one or more factory keys.

10. The method recited in claim 9, wherein the operational keys are not stored in an unencrypted form in a non-volatile storage device of a manufacturer of the meter.

11. The method recited in claim 1, wherein providing the stored file is in response to receiving a request for the file from a customer of the meter.

12. The method recited in claim 1, wherein the file comprises a secure key transfer file that is encrypted.

13. The method recited in claim 1, wherein the public key is obtained from a customer of the meter.

14. A system comprising:
one or more hardware processors;
memory communicatively coupled to the one or more processors, the memory being within a manufacturing tool and/or a key generator that is configured to:
receive a request, at the manufacturing tool and/or the key generator, to generate meter keys that include one or more operational keys that secure commands that control operation of a meter;
generate the meter keys in response to the request;
provide the generated meter keys to the manufacturing tool and/or the key generator to inject the meter keys into the meter;
encrypt at least one of the one or more operational keys using a public key associated with a private key that is unknown to an entity performing the method;
store a file comprising the encrypted one or more operational keys; and
provide the stored file, wherein the stored file is associated with an identifier of the meter.

15. The system recited in claim 14, wherein the one or more operational keys are not stored in an unencrypted form in non-volatile storage of the key generator or the manufacturing tool.

16. The system recited in claim 14, wherein:
the key generator is used as part of a manufacturing process of the meter; and
the public key is obtained from a customer of the meter.

17. The system recited in claim 14, wherein:
the meter keys are symmetric encryption keys;
the meter keys further include one or more non-operational keys that are not encrypted by the public key; and
the file further comprises the one or more non-operational keys.

18. One or more computer-readable memory devices storing instructions that, when executed by one or more hardware processors, perform acts comprising:
receiving a request, at a manufacturing tool and/or a key generator, for generation of meter keys for a meter, wherein the request comprises an identification of one or more operational keys for securing commands that control an operation of the meter;
generating the meter keys in accordance with the request;
providing the generated meter keys to cause injection of the meter keys into the meter as part of a manufacturing process of the meter;
encrypting at least the one or more operational keys using a public key, wherein the public key is associated with a private key that is unknown to an entity performing the method;
storing a file comprising the encrypted one or more operational keys and an identifier of the meter; and
providing the stored file and the associated meter to a customer.

19. The one or more computer-readable media recited in claim 18, wherein:
the meter keys include symmetric encryption keys;
the meter keys further include one or more non-operational keys that are not encrypted by the public key; and
the file further comprises the one or more non-operational keys.

20. The one or more computer-readable media recited in claim 18, wherein:

the public key is provided to a manufacturer of the meter by a customer of the meter;

the encrypted one or more operational keys are associated with a private key of the customer; and the encrypted one or more operational keys are unable to be decrypted by the manufacturer.

* * * * *